(12) United States Patent
Iagulli et al.

(10) Patent No.: US 11,097,522 B2
(45) Date of Patent: Aug. 24, 2021

(54) METHOD FOR MANUFACTURING A MULTI-RIBBED WING-BOX OF COMPOSITE MATERIAL WITH INTEGRATED STIFFENED PANELS AND COMMUNICATING BAYS

(71) Applicant: LEONARDO S.p.A., Rome (IT)

(72) Inventors: Gianni Iagulli, San Severo (IT); Marco Raffone, Naples (IT); Alberto Russolillo, Foggia (IT); Tommaso Nanula, Barletta (IT); Giuseppe Totaro, Lucera (IT)

(73) Assignee: LEONARDO S.p.A., Rome (IT)

( * ) Notice: Subject to any disclaimer, the term of this patent is extended or adjusted under 35 U.S.C. 154(b) by 127 days.

(21) Appl. No.: 16/680,863

(22) Filed: Nov. 12, 2019

(65) Prior Publication Data
US 2020/0147947 A1 May 14, 2020

(30) Foreign Application Priority Data

Nov. 14, 2018 (IT) .................. 102018000010326

(51) Int. Cl.
*B32B 3/00* (2006.01)
*B32B 7/00* (2019.01)
(Continued)

(52) U.S. Cl.
CPC .......... *B32B 37/0076* (2013.01); *B32B 3/085* (2013.01); *B32B 7/12* (2013.01);
(Continued)

(58) Field of Classification Search
CPC .. B32B 3/00; B32B 3/08; B32B 3/085; B32B 7/00; B32B 7/10; B32B 7/12;
(Continued)

(56) References Cited

U.S. PATENT DOCUMENTS 5,242,523 A * 9/1993 Willden ............. B29D 99/0014
156/285

FOREIGN PATENT DOCUMENTS

EP 3150484 A1 4/2017

OTHER PUBLICATIONS

Italian Search Report IT 102018000010326 dated Jul. 2, 2019.

* cited by examiner

*Primary Examiner* — Jacob T Minskey
*Assistant Examiner* — Matthew Hoover
(74) *Attorney, Agent, or Firm* — Arent Fox LLP; Michael Fainberg

(57) ABSTRACT

A method for manufacturing a wing-box for aircraft comprises: arranging, on a curing surface, a first panel of composite material comprising a skin a plurality of longitudinal stringers, and arranging, on each stringer, a caul plate; arranging, on the first panel, pluralities of support inserts so that each support insert rests on a respective caul plate, and on the skin of the first panel, and arranging, on the first panel, a plurality of ribs of non-polymerized composite material, each rib comprising a plate, a first pair of flanges and a second pair of flanges arranged at opposed ends of the plate, and having openings on an edge of the plate, by placing the respective first pair of flanges on the first panel and the respective plurality of openings on the plurality of support inserts, and having the first panel and the plurality of ribs undergo a curing process in autoclave with vacuum bag.

18 Claims, 6 Drawing Sheets

(51) Int. Cl.
*B32B 37/00* (2006.01)
*B64C 3/00* (2006.01)
*B64F 5/10* (2017.01)
*B32B 3/08* (2006.01)
*B32B 7/12* (2006.01)
*B32B 37/10* (2006.01)
*B32B 37/12* (2006.01)
*B64C 3/18* (2006.01)
*B64C 3/26* (2006.01)
*B64C 3/34* (2006.01)

(52) U.S. Cl.
CPC .............. *B32B 37/10* (2013.01); *B32B 37/12* (2013.01); *B64C 3/182* (2013.01); *B64C 3/187* (2013.01); *B64C 3/26* (2013.01); *B64F 5/10* (2017.01); *B32B 2260/021* (2013.01); *B32B 2260/046* (2013.01); *B32B 2262/101* (2013.01); *B32B 2262/106* (2013.01); *B32B 2605/18* (2013.01); *B64C 3/185* (2013.01); *B64C 3/34* (2013.01)

(58) Field of Classification Search
CPC ... B32B 37/00; B32B 37/007; B32B 37/0076; B32B 37/10; B32B 37/12; B64C 3/00; B64C 3/10; B64C 3/18; B64C 3/182; B64C 3/187; B64C 3/20; B64C 3/26
See application file for complete search history.

METHOD FOR MANUFACTURING A MULTI-RIBBED WING-BOX OF COMPOSITE MATERIAL WITH INTEGRATED STIFFENED PANELS AND COMMUNICATING BAYS

CROSS-REFERENCE TO RELATED APPLICATION

This application claims priority to Italian Patent Application No. 102018000010326 filed Nov. 14, 2018, the entire contents of which is hereby incorporated in its entirety by reference.

FIELD OF THE INVENTION

The present invention relates in general to a method for manufacturing a structural part for aircraft. In particular, the invention relates to a method for manufacturing a multi-ribbed wing-box of composite material with integrated stiffened panels and communicating bays, that may be used as a structural wing-box in a so called 'wet wing', that is a wing used also as a fuel tank, or in a vertical or horizontal empennage.

BACKGROUND OF THE INVENTION

The configuration currently adopted for aeronautical boxes—for wings or empennages of fixed-wing aircraft—consists of a set of different primary structural components, such as, typically, two stiffened panels with longitudinal stringers, two longitudinal spars, a certain number of transverse ribs, angular elements and conventional mechanical fastening elements.

These components, made of composite material and/or metal, are manufactured individually and, subsequently, are assembled in the final configuration of the wing box through drilling operations and installation of mechanical fastening members (rivets, bolts and the like). This conventional configuration is called 'build-up' configuration, and is characterized by significant disadvantages in terms of production costs, including a large number of parts to be manufactured and managed in the production system, a very onerous assembly process due to the large number of holes to be made and fastening members to be installed, as well as the inspections necessary to verify the absence of openings or space between the coupled parts, and the additional activities required during construction to apply any fillers needed to fill the aforesaid gaps, when present. In addition, the so-called build-up configuration also entails significant drawbacks in the weight of the structure, which are badly tolerated in aeronautical applications, especially due to the increase in the operating cost of the aircraft, i.e. in fuel consumption. The weight increase for these assemblies is essentially due to the unavoidable presence of holes in the coupling areas between the various elements. Indeed, the holes, being a localized weakening of the component, require a thickening of the areas concerned, in order to safely withstand the design load. In addition, for composite structures, the weight of the fastening members also has a negative effect, since it is greater than the weight of the portion of material removed.

Among the known techniques for manufacturing empennages, there is also one that allows the creation of integrated multi-spar wing boxes in co-cured composite. This technology, while overcoming all the technical problems typical of the build-up configuration mentioned above, is characterized by significant geometric and configuration limitations that limit its applicability to solely horizontal stabilizers of commercial aircraft. Specifically, multi-spar co-cured wing boxes are not sufficiently competitive, in terms of weight and cost, with respect to wing boxes in build-up configuration for structures for which a high resistance to torsion is required, such as wing boxes and vertical stabilizers boxes. A further technical problem of this technology is that it is not applicable to configurations that provide for the presence, in addition to the spars, of additional reinforcement stringers, for the longitudinal stiffening of the structure. Furthermore, according to the prior art, it is not possible to make wing boxes with highly curved aerodynamic profiles and/or with inner thickening or stiffening elements in a transverse direction (i.e., that extend in the direction of the length of the wing profile), or with the stringers interrupted in the longitudinal direction (i.e., perpendicular to the direction of the length of the wing profile) of the wing box, or to make a wing-box for a "wet wing", that is a wing-box provided with openings between adjacent bays to allow passage of fuel between them.

SUMMARY OF THE INVENTION

The object of the present invention is to provide a method for manufacturing a wing-box for aircraft that overcomes the drawbacks and limitations of applicability of the known prior art, and allows manufacturing of a multi-ribbed wing-box of composite material suitable for a so called "wet wing", that is a wing-box whose bays are used as fuel tanks and wherein two adjacent bays are in fluid communication, without causing structural and quality defects, including local thinning or resin accumulation at the communication openings between the bays.

This and other objects are fully achieved according to the present invention through a method for manufacturing a wing-box for aircraft as described and claimed herein.

Advantageous embodiments of the invention are also described.

In short, the invention is based on the idea of providing a method for manufacturing a wing-box for aircraft wherein the wing-box comprises a first panel, stiffened with a plurality of longitudinal stiffening stringers, and a plurality of ribs, arranged transversally, which are subjected jointly to a single curing process, wherein a plurality of support inserts is arranged in openings of each rib and in contact with respective caul plates to ensure the stability of the openings during the curing process. It is also possible to use a plurality of tools, that is of auxiliary tools, to ensure precise relative positioning of the components, each of said tools comprising, for example, a central removable part, which allows the removal of the tools even when the main body is fully assembled.

At the end of the method, a pair of spars may be mechanically assembled to the wing-box, in a known-per-se manner, with external closure on the long sides of the wing box.

According to an embodiment of the invention, the first panel is supplied already polymerized, and the plurality of ribs is assembled to it by means of a co-bonding process, i.e. a ply of adhesive material is placed between the first panel and the ribs before curing.

Advantageously, the support inserts are made in a plastic material resistant to the specific pressure and temperature cycle of the curing process, including thermoplastic resin or pre-cured silicon rubber.

By virtue of the arrangement of the support inserts, it is possible to manufacture a multi-ribbed wing-box of composite material with integrated stiffened panels and communicating bays, without thereby causing any thinning and/or resin accumulation close to the openings provided in each rib, and ensuring general stiffness and stability during the curing step.

Further features and advantages of the present invention will become apparent from the detailed following description, provided by way of non-limiting example with reference to the drawings.

DETAILED DESCRIPTION OF PREFERRED EMBODIMENTS

Figure 1:
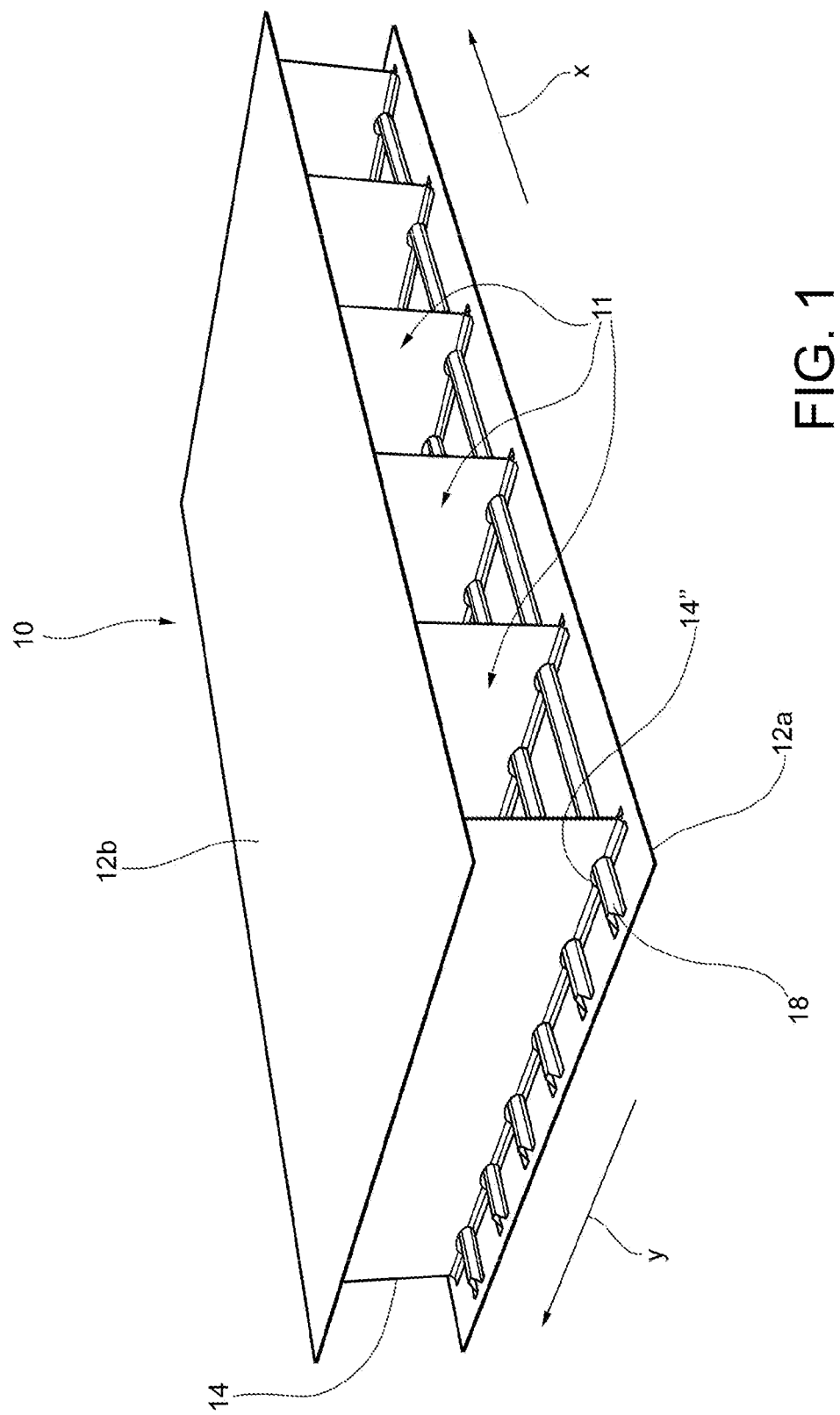
FIG. 1 is a perspective view of a wing-box according to a possible embodiment of the invention, completed with a second panel.

In the present context, the term 'longitudinal' indicates a direction substantially coincident or parallel with that of the main extension of the wing or of the empennage, while the term 'transverse' indicates a direction substantially perpendicular thereto, identifiable, in general, with a direction substantially coincident or parallel with that of a wing or empennage profile.

With reference to the Figures, a wing-box for aircraft as a whole is indicated with 10.

The wing-box 10 comprises a first panel 12a and a plurality of ribs 14 that separate different bays 11 from each other. The wing-box may be completed with a second panel 12b, placed on top of the bays 11 to close them, and that may be mechanically assembled in a known-per-se manner at the end of the process, or be connected by means of a curing process or of a "co-bonding" process by means of a supplementary adhesive ply.

The first panel 12a, the second panel 12b and the ribs 14 are made of composite material. Preferably, the composite material comprises a matrix in thermoset resin or bismaleimide and/or a carbon and/or glass fibre reinforcement.

The first panel 12a and the second panel 12b may be made in a similar way. In this example, for the sake of brevity, only the first panel 12a will be described, it being understood that the second panel 12b is generally made up of elements similar or identical to those of the first panel 12a, obtained by means of similar manufacturing processes.

The first panel 12a comprises a skin 16 and a plurality of reinforcement stringers 18.

The skin 16 comprises a sequence of plies of composite material, preferably of an epoxy resin matrix composite material with long carbon fibre reinforcement. The skin 16 may be obtained, for example, by means of lamination by hand or with automated systems according to the guidelines defined by the design of the component, or by means any other known process for laminating layers of composite material. In the lamination of the skin 16, vacuum bag compaction with or without heat application may be carried out in a manner known per se.

The stringers 18 may have a closed cross-section of the omega type, trapezoidal type, or according to other geometries. Preferably, the stringers 18 have an omega-type cross-section. The stringers 18 may be obtained by any known procedure for processing composite materials. For example, the stringers 18 may initially be flat-laminated, similarly to the skin 16, and then cut with a clean profile along an edge thereof, and subjected to a forming process, in accordance with different operating methods according to the known art. For example, the stringers 18 may be formed on a male mould with membrane and vacuum application, or on a female mould with moulding, with or without heat application, etc. Alternatively, the stringers 18 may be laminated directly onto a mould, one ply at a time.

The fresh, i.e., as of yet non-polymerized, stringers 18 may then be precisely positioned on the skin 16 by the use of auxiliary tools to support the stringers 18, and tilting systems coordinated with a lamination surface (not shown, but known per se) of the skin 16.

When the stringers 18 have been positioned on the skin 16, elongated stabilization inserts 17, preferably made of solid cross-section silicone rubber, may be positioned in the space defined between each stringer 18 and the skin 16. The elongated stabilization inserts 17 placed in this space act as a support, whereon, during the process of polymerization in autoclave, the plies of composite material of each stringer 18 are consolidated, acquiring the final design shape. The advantage of the elongated stabilization inserts 17 is that they are flexible enough to adapt to any ramps and steps that may be envisaged on the skin 16 underneath the stringers 18. The elongated stabilization inserts 17 are able to tolerate the high temperature and pressure levels expected in the autoclave for the curing process (generally, about 180° C. and 6 bar), without deformation and degradation, avoiding geometric defects to the stringers 18. Advantageously, the elongated stabilization inserts 17 are made with a silicone rubber compound that ensures the absence of contamination of the matrix of the composite material of the first or second panel 12a or 12b, and their thermal expansion must be controlled to ensure compliance with the geometric requirements and the proper compaction of each stringer 18 after the curing process. Preferably, the elongated stabilization inserts 17 are made of a rubber of the group of basic VMQ elastomers (i.e., vinyl-methyl-polysiloxane, group Q, according to the ISO 1629 standard) having, for example, a hardness of about 70 shore A, a density of about 1.2 g/cm3, and a thermal expansion coefficient of about 250 μm/m° C. Other known methods for obtaining stringers 18 made of composite material according to the invention comprise, for example, the use of inflatable tubular bags.

On an outer surface of each stringer 18, a caul plate 23 is typically placed made of carbon fibre or metal, sufficiently flexible, for example consisting of two consecutive layers of composite material, or aluminium layers of 0.5-1 mm. Said caul plate 23 ensures that the shape of the stringers 18 is maintained during the curing process.

By virtue of these and other known processes for manufacturing components from composite laminate materials, it is thus possible to obtain a first panel 12a and a second panel 12b that are fresh, i.e. non-polymerized or uncured, each comprising the skin 16, and the plurality of reinforcement stringers 18, arranged on a first side 16' of the skin 16. These stringers 18 extend along a longitudinal direction x, i.e., parallel to a main direction of extension of the wing or the empennage. The first and second panels 12a and 12b thus obtained are, as known to the person skilled in the art, substantially curved according to the technical specifications of the wing or empennage to be obtained.

The plurality of ribs 14 may comprise ribs 14 that are identical or similar in shape and proportions. More likely, each rib 14 is different, depending on the variability of the thickness of the wing or empennage to be obtained, and the specific geometric characteristics of the lower or upper surfaces of the airfoil, and the typical tapering of the wing box 10 along the longitudinal direction, in a manner known per se.

The ribs 14 may, for example, have a double T shape obtained by placing two C-shaped elements side by side, preferably with the addition of fillers made of unidirectional preformed pre-preg material (called 'noodles', not shown and known per se) in cavities created at the coupling of the two C-shaped elements. For example, each C-shaped element may be flat-laminated, and then cut with a clean profile along one of the edges thereof, to then undergo a forming process in accordance with various operating modes according to the known art. Alternatively, each C-shaped element may also be laminated directly onto a male mould, one ply at a time, after the numerically-controlled cutting of each of them. The cutting, carried out flat, with a clean profile of each C-shaped element, must also take into due consideration the presence of a plurality of through openings 14', spaced along an edge 15c of the plate 15 of each rib 14, provided at the points of intersection with the stringers 18 of the first panel 12a and/or the second panel 12b.

In fact, each rib 14, made of composite material, comprises a central plate 15, a first pair of flanges 15a and a second pair of flanges 15b, and has a plurality of openings 14', arranged spaced along an edge 15c of the plate 15. The first pair of flanges 15a and the second pair of flanges 15b are arranged at opposite ends of the plate 15, so as to obtain a conventional double-T cross-section. Preferably, each rib 14 has a plurality of through openings 14' spaced along two opposed edges 15c of the plate 15, provided at the points of intersection with the stringers 18 of the first panel 12a, along an edge 15c, and of the second panel 12b, along an opposed edge 15c.

Figure 3:
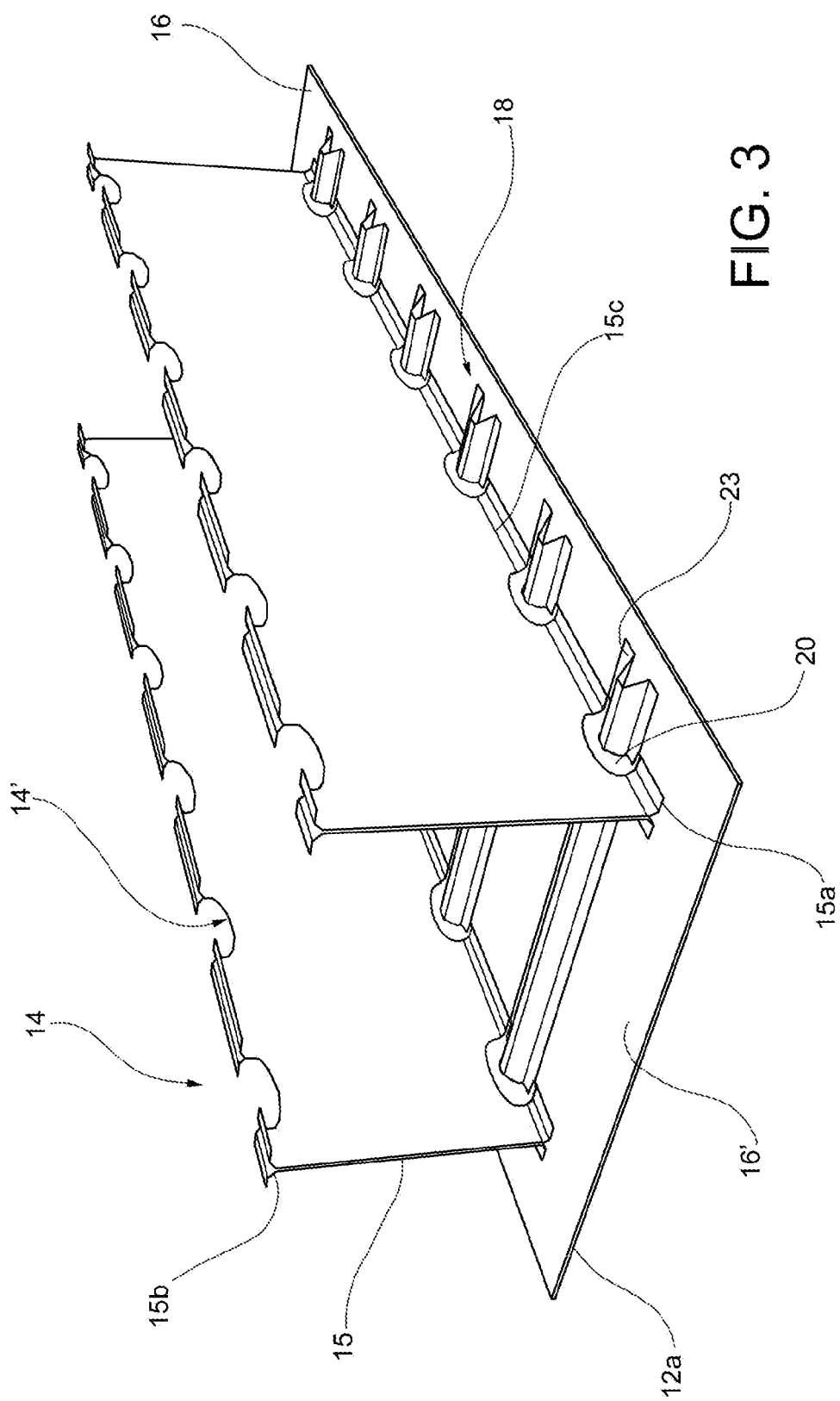
FIG. 3 is a perspective view of a first panel, a plurality of support inserts, and a pair of ribs.
Figure 4:
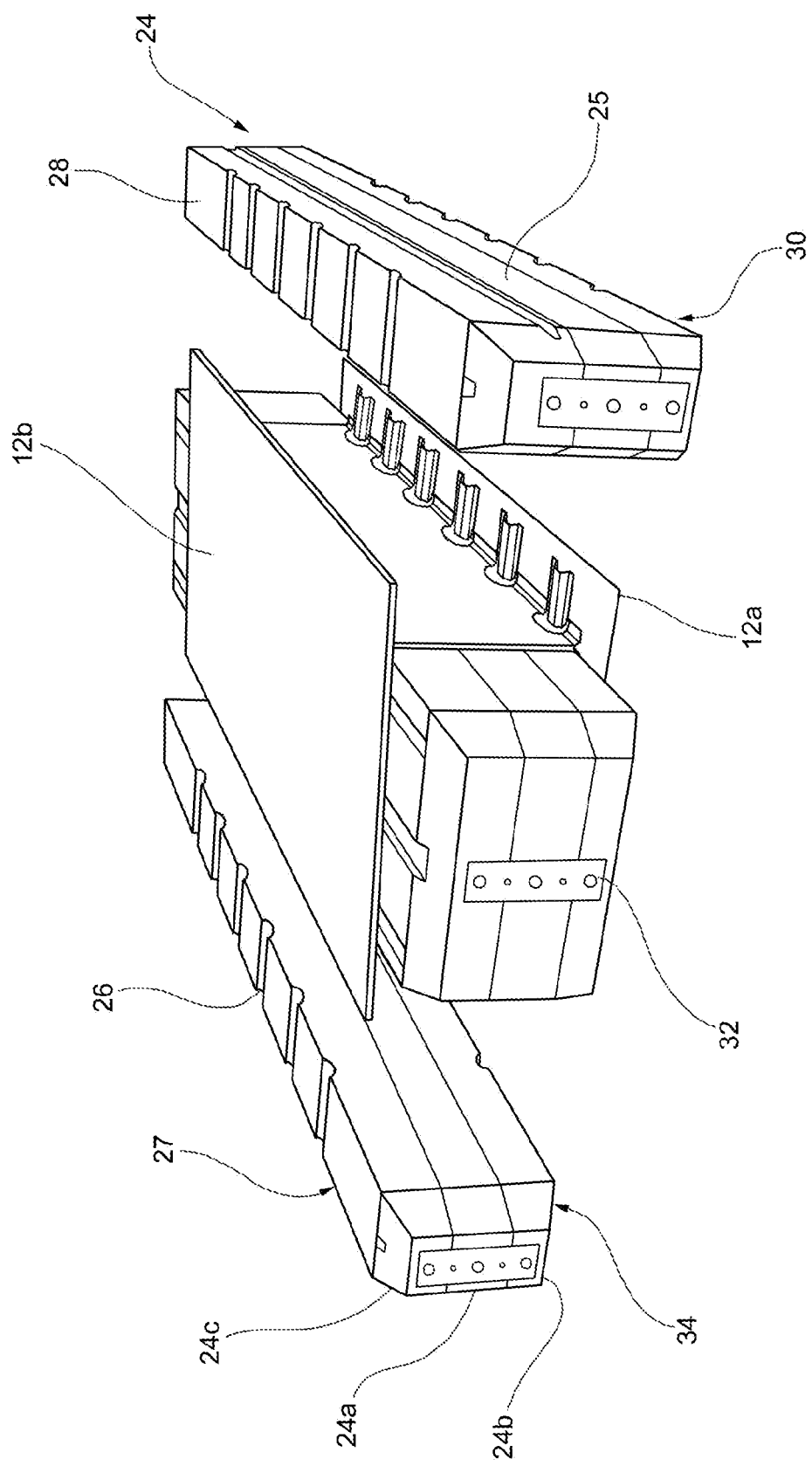
FIG. 4 is a perspective view of a first and of a second panel, of a pair of ribs and of a plurality of tools.

By virtue of the openings 14', it is possible to put two adjacent bays 11 in fluid communication with each other. By means of the support inserts 20, to be positioned in said openings 14', in contact with the ribs 14, as shown by FIG. 3, the stability of the shape of the openings 14' can be ensured even during the curing process, and the presence of resin accumulation or of other defects in their vicinity can be avoided.

Figure 5:
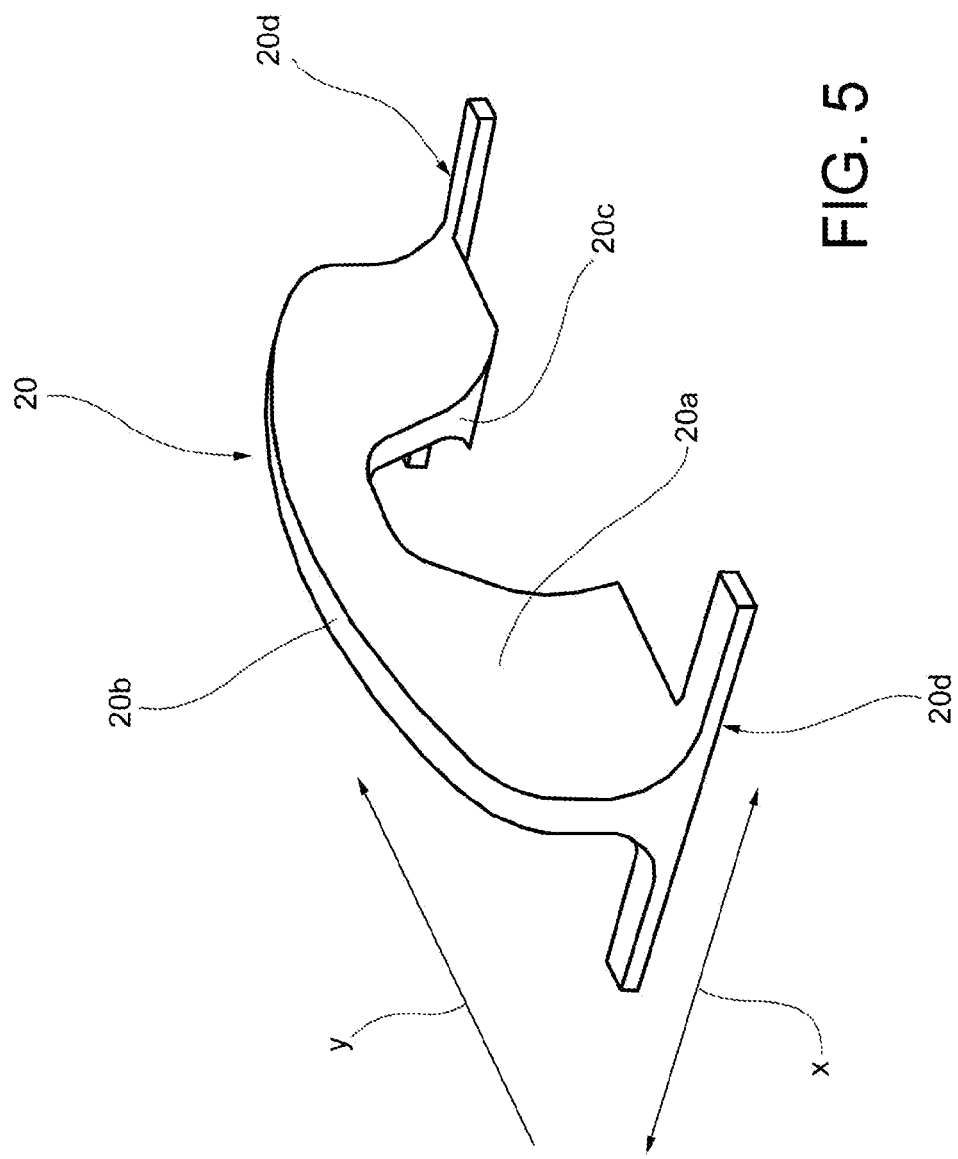
FIG. 5 is a perspective view of a support insert.

As shown in detail in FIG. 5, each support insert 20 comprises a bridge element 20a, an extrados surface 20b, a intrados surface 20c and a base portion 20d, arranged to be placed either on the skin 16' of the first panel 12a or on a caul plate 23 placed on a stringer 18.

The extrados surface 20b is arranged to be put in contact with a respective surface of an opening 14' of a rib 14. As a consequence, the shape of the extrados surface 20b will be, preferably, essentially complementary to the one of the opening 14'.

The intrados surface 20c is, instead, arranged to be placed on a caul plate 23; therefore, preferably, it copies its external shape.

The transverse cross-section shape of the support insert 20 determines the shape of the passage 14" that will be obtained in the curing process.

The base portion 20d offers an enlarged support base to keep each support insert 20 correctly oriented. In particular, the base portion 20d may be provided as a pair of feet, as shown in FIG. 5, for example shaped as a pair of parallel bars, essentially perpendicular to a plane passing by the middle line of the extrados surface 20b or of the intrados surface 20c, and extending at least partially on each side of such plane. The base portion may, alternatively, be provided as an enlarged truncated-pyramid base.

Said support inserts 20 have, preferably, the same thickness of the rib 14, i.e. a cross-section in a longitudinal direction x at the extrados surface 20b has a thickness essentially equivalent to the one of the plate 15 of the rib 14, either equal or greater than that, and a shape that essentially fills the space between the flat cut of the openings 14' and the stringer 18 of the first or second panel 12a or 12b or the caul plate 23 on which they rest. The support inserts may be made in a plastic material resistant to the temperatures and the pressures typical of the curing process, including a thermoplastic resin, when provided as rigid inserts, or pre-cured silicon rubber, when provided as flexible inserts, and are free of sharp edges in order to avoid any damage to the film of the curing bag with which they will come in contact.

By virtue of these and other known processes for manufacturing components from composite laminate materials, it is thus possible to obtain a plurality of fresh, i.e. non-polymerized, ribs 14, each having, preferably, a double T-shaped cross-section, and each having a plurality of openings 14', provided at the points of intersection with the stringers 18 of the first panel 12a and/or the second panel 12b.

A manufacturing process of a multi-ribbed wing box 10 made of composite material from a first and second panel 12a and 12b and from a plurality of ribs 14 will now be described.

Figure 2:
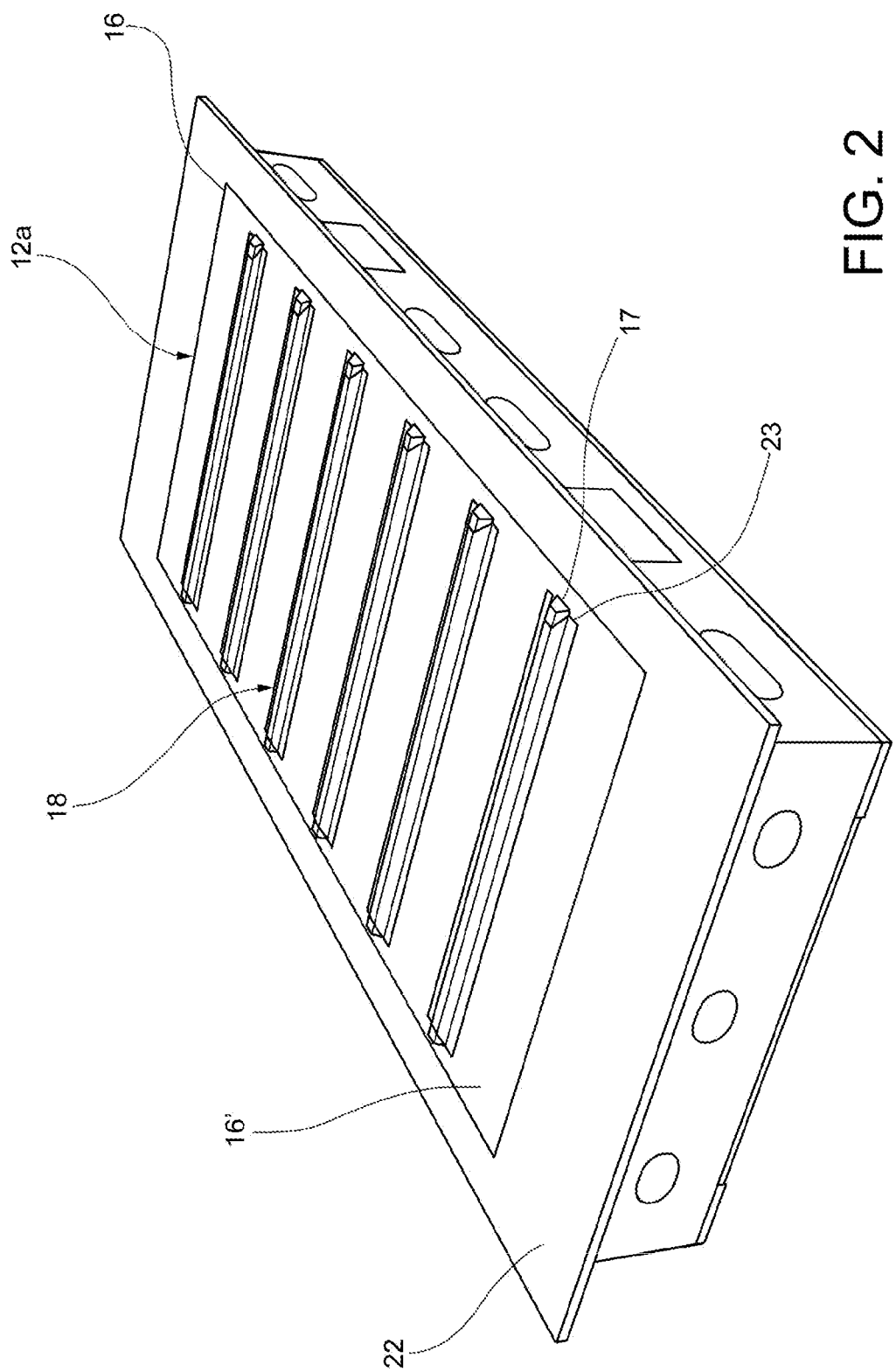
FIG. 2 is a perspective view of a first panel arranged on a curing surface.

Initially, as shown in FIG. 2, the first panel 12a made of composite material, comprising the skin 16 and a plurality of stringers 18, is arranged on a suitable curing surface 22. A respective caul plate 23 is arranged on each stringer 18, in a way to cover it.

Then, the support inserts 20 are placed on the first side 16' of the first panel 12a and/or on the caul plate 23. Said support inserts 20 are arranged aligned along a transverse direction y, essentially in correspondence of the points in which the subsequent arrangement of the ribs 14 crosses each stringer 18. In particular, each support insert 20 is arranged so that the respective intrados surface 20c rests on a respective caul plate 23, and each respective base portion 20d rests either on the skin 16' of the first panel 12a or on the caul plate 23 placed on the stringer 18, or on both the parts.

Then, as shown in FIG. 3, the plurality of ribs 14, in this example two ribs 14, made of non-polymerized composite material, are placed on the first side 16' of the skin 16 of the first panel 12a. In particular, the first rib 14 is initially arranged along a transverse direction y, i.e. in a manner substantially perpendicular to the stringers 18. In particular, the first rib 14 is arranged by placing its respective first pair of flanges 15a in contact with the first side 16' of the skin 16 of the first panel 12a, so that the openings 14' are positioned in correspondence with the stringers 18, which will each extend through a respective opening 14'. In particular, each rib 14 is arranged so that the openings 14' are arranged in correspondence with the support inserts 20, by placing each opening 14' on the extrados surface 20b of a respective support insert 20.

It is also possible to insert, inside each opening 14' of the ribs 14, the respective support inserts 20, by putting the respective extrados surfaces 20b of each support insert 20 in contact with a respective surface of each opening 14', and then arranging the plurality of ribs 14 on the first side 16 of the first panel 12a, wherein each rib 14 accommodates the respective support inserts 20 in the relative openings 14', by placing the intrados surfaces 20c of the support inserts 20 on a respective caul plate 23, and the base portions 20d of the support inserts 20 either on a respective caul plate 23, on the skin 16' of the first panel 12a, or on both the parts.

At this point, a tool 24 may be placed on said first side 16' of the skin 16 of the first panel 12a, in contact with the first rib 14.

The tool 24 may also have the function of supporting the bag materials to be used in the curing process, which are arranged to totally wrap each tool 24, and which, being flexible (being, in effect, films and plastic fabrics) could not otherwise be located within the bays 11—i.e. the spaces defined between two consecutive ribs 14—for total and complete coverage of the composite surfaces to be polymerized. Moreover, the tool 24 also has the function of distancing and holding the ribs 14 in the theoretical positions provided by design and allows transfer of the plurality of ribs 14 (preformed and non-polymerized) onto the first panel 12a.

For the specific configuration of the example of a wing box 10 shown in the Figures, the tool 24 has, preferably, dimensions suitably smaller than the theoretical inner surfaces of the bays, in order to guarantee sufficient space for the thickness of the bag materials to cover the tool.

Advantageously, the tool 24 is provided with grooves 26, shaped to accommodate the stringers 18 and the caul plates 23 thereof. In particular, a tool provided with grooves 26 both on its top surface 28 and on its bottom surface 30, opposite to its top surface 28, is arranged to accommodate both stringers 18 of the first panel 12a and stringers 18 of the second panel 12b in said grooves 26. Said grooves 26 are, in particular, manufactured considering also the presence, in correspondence of the points of intersection of the ribs 14 and the stringers 18, of the respective support inserts 20.

Preferably, the tool 24 is made of low-mass density material, in particular, for example, a material having a mass density of less than 1.7 g/cm3, and in a configuration with high bending stiffness, in particular, for example, able to contain the bending strain within one millimetre per meter of length, this being in order to allow easy handling, even manually, of the tool 24, and to avoid any deformations that could be transferred to the ribs 14 in the fresh state during their positioning on the first panel 12a. To avoid damaging the materials of the bag due to impacts and/or tears with the tools 24, the tools 24 may be made of resin or by using plastic materials, with or without reinforcements.

In addition, the tool 24 is capable of withstanding a positive pressure of at least 1 bar without collapsing, yielding or deforming, as during the dressing thereof with the bag materials the application of a vacuum may be envisaged.

The tool 24 may be made of several modular parts, in particular at least three modular parts, to allow extraction thereof from each bay after the closure with the second panel 12b, this being despite the undercuts offered by the configuration of the wing box 10, resulting both from the presence of stringers 18 on the skin 16 of the first panel 12a and on the skin 16 of the second panel 12b, and from any curved profile that the first and the second panel 12a and 12b may have.

For these reasons, the tool 24 comprises a central part 24a, a bottom part 24b and a top part 24c, wherein the central part 24a is interposed between said bottom part 24b and said top part 24c, and is extractable along the transverse direction y.

Preferably, at least two among the central part 24a, the bottom part 24b and the top part 24c are bound together by a removable constraint element 32. The constraint element 32 may comprise, for example, a plate which extends partially onto each of the parts of the tool 24, and which is bound to each part by conventional mechanical fastening elements, such as screws or bolts.

The central part 24a of the tool 24 has, advantageously, a tapered section along the transverse direction y. In any case, the central part 24a of the tool has a section such that it may be pulled out along the transverse direction y, for example a section that decreases linearly from one end of the central part 24a to the other along the transverse direction y.

Advantageously, at least one among the central part 24a, the bottom part 24b and the top part 24c of the tool 24 has chamfers 34 adapted to improve the handling thereof.

Once a tool 24 has been placed in contact with the first rib 14, a second rib 14 is placed, in the same way as the first rib 14, on said skin 16 of the first panel 12a, along the transverse direction y, in contact with the tool 24, on the side opposite to the first rib 14.

Alternatively, the plurality of ribs 14 and tools 24 may be loaded simultaneously on the side 16' of the skin 16. According to this embodiment, it is possible to arrange a first tool 24, placing it on its first lateral surface 25—thus substantially rotating it by 90°—so as to have upwards a second lateral surface 27 thereof, opposite to the first lateral surface 25. Then, one proceeds to position a rib 14 on said first tool 24, placing the respective plate 15 on said second lateral surface 27. At this point, it is possible to insert, inside each opening 14' of the ribs 14, the respective support inserts 20 making sure that the respective extrados surfaces 20b of each support insert 20 are put in contact with a respective surface of each opening 14'. This step may be carried out along two opposed edges 15c of the plate 15 of each rib 14, i.e. on all the openings 14' of the ribs 14. One thus proceeds by alternating the arrangement of a tool 24 and a rib 14 so as to obtain an assembly comprising an alternating succession of tools 24 and ribs 14 that begins and ends with a pair of outer tools 24. The assembly is then appropriately rotated and subsequently positioned on the skin 16 of the first panel 12a, so that each first pair of flanges 15a rests on said first side 16' of the first panel 12a and either that each opening 14' rests on a respective support insert 20 as previously positioned, or that each support insert 20 already inserted into the respective opening 14' rests on the caul plate 23 previously placed on the stringer. This operation may be coordinated with precision by means of suitable metallic systems of engagement arranged both on the curing surface 22 and at the ends of the tools 24.

In essence, a rib 14 and a tool 24 are arranged alternately so that each pair of consecutive ribs 14 is in contact with a same tool 24.

Before being placed inside a respective bay 11, i.e., in contact between a pair of consecutive ribs 14, each tool 24 may be dressed with the bag materials necessary for the curing process in autoclave.

In particular, the dressing may be carried out with bag materials typical of the vacuum bag curing process in autoclave, such as, for example, high-temperature nylon film, surface ventilation nylon or polyester fabric, high-temperature separator film. These may be arranged manually on each tool 24 in sequence, one on top of the other, forming, by using tapes and sealant, a tubular extension that completely wraps each tool 24, like a candy. Alternatively, the necessary bag materials may already be made in a tubular format, and fitted like a sock on each tool 24. After dressing, the vacuum may be applied to the outermost ply of the curing bag to ensure that the bag materials are adapted to the surfaces of each tool 24, avoiding wrinkling and bridging of the same materials.

Once all the necessary ribs 14 and tools 24 have been arranged, between each pair of consecutive ribs 14 there being thus arranged a respective tool 24 in contact with both ribs 14, the second panel 12b is arranged. The second panel 12b is placed in contact with each second pair of flanges 15b of each respective rib 14, covering each bay 11, i.e., the spaces between each pair of consecutive ribs 14. It is possible to arrange the support inserts 20 in contact with the skin 16 of the second panel 12b and/or with the caul plate 23 placed on the stringers 18 of the second panel 12b also in the openings 14' provided along the edge 15c of the plate 15 of the ribs 14 close to the second panel 12b, in a way similar to what explained with respect to the first panel 12a.

The correct positioning of the second panel 12b may be ensured, for example, by mechanical coordination systems, such as existing male/female cones, or by other suitable known precision handling systems.

In an embodiment, it is possible to use a first panel 12a made of already polymerized composite material, and, thus, to arrange a respective ply of high-temperature structural adhesive between each first pair of flanges 15a of each rib 14 and said first side 16' of the first panel 12a. Similarly, it is also possible to use a second panel 12b made of already polymerized composite material, and thus to arrange a respective ply of high-temperature structural adhesive between each second pair of flanges 15b of each rib 14 and said first side 16' of the second panel 12b. When a first or second panel 12a or 12b of already polymerized composite material is used, the curing process is called co-bonding and the ply of structural adhesive guarantees adhesion between the ribs 14 and the first or second panel 12a or 12b, respectively.

In a further embodiment, it is possible to interpose, between the second panel 12b and the second pair of flanges 15b of each rib 14, a respective high-temperature release ply (such as, for example, FEP or PTFE) in order to make, after the curing process, the second panel 12b removable from the rest of the wing box 10, in order to ensure accessibility to the interior thereof for any installation of systems or structural components. The second panel 12b may subsequently be mounted on the ribs 14 with traditional methods, taking advantage of the fact that, following the curing process, the profile of the second pair of flanges 15b has been moulded on the second panel 12b (except for the release film, which is generally very thin, for example, having a thickness of about 0.1 mm), facilitating the perfect coupling of the parts.

Advantageously, it is possible to arrange a pair of tools 24 externally on said first side 16' of the skin 16 of the first panel 12a, respectively in contact with a first and a last rib 14.

The process may be completed by sealing the respective ends of the curing bags of each tool 24 together and on the respective surfaces of the curing surface 22 and a respective top curing tool arranged on the second panel 12b, and with two additional strips of bag materials placed outside the wing box 10 on the outer tools 24.

After having applied the full vacuum to the curing bags and carrying out the necessary leak tests, each tool 24 is pulled out from the bays 11 and the external tools 24 are removed. The extraction of the tools 24 from the bays 11 is made possible by virtue of the particular configuration of each tool 24. Specifically, it is possible, first of all, to proceed with the extraction of the central part 24a, keeping, preferably, the top part 24c constrained, in order to avoid its fall by gravity. Then, the top part 24c may be removed, and finally the bottom part 24b.

It is possible to extract or remove the central part 24a of each tool 24 solely by a pulling action in the transverse direction y. Then, the top part 24c and the bottom part 24b of each tool 24 are first moved in a vertical direction to bypass the undercuts inside the bays, and then pulled along the transverse direction y.

When present, it is necessary to remove the constraint element 32 before proceeding with the extraction of the central part 24a of each tool 24, so as to be able to release the central part 24a, the bottom part 24b and the top part 24c from each other.

It is also possible to remove the tools 24 after the curing process in autoclave.

Finally, the assembly comprising the first panel 12a, the plurality of ribs 14, and possibly the second panel 12, undergoes a curing process. The curing process is known per se and involves the application of a specific temperature and pressure cycle, and will not be described further.

After the curing process, it is possible to proceed with breaking up, i.e., removal of the curing bags, and then with lifting the top curing tool, and, finally, with removal of the caul plates 23 and of the elongated stabilization inserts 17 placed between the stringers 18 and the skin 16. After the curing step, said support inserts 20 are removed, so as to leave, in place of each support insert 20, a respective passage 14", arranged to put two adjacent bays 11 of the wing-box 10 in fluid communication with each other. The passage 14" obtained has a cross-section essentially equivalent to the cross-section of the opening 14', apart from the space occupied by the respective stringer 18 and by the respective caul plate 23.

Figure 6:
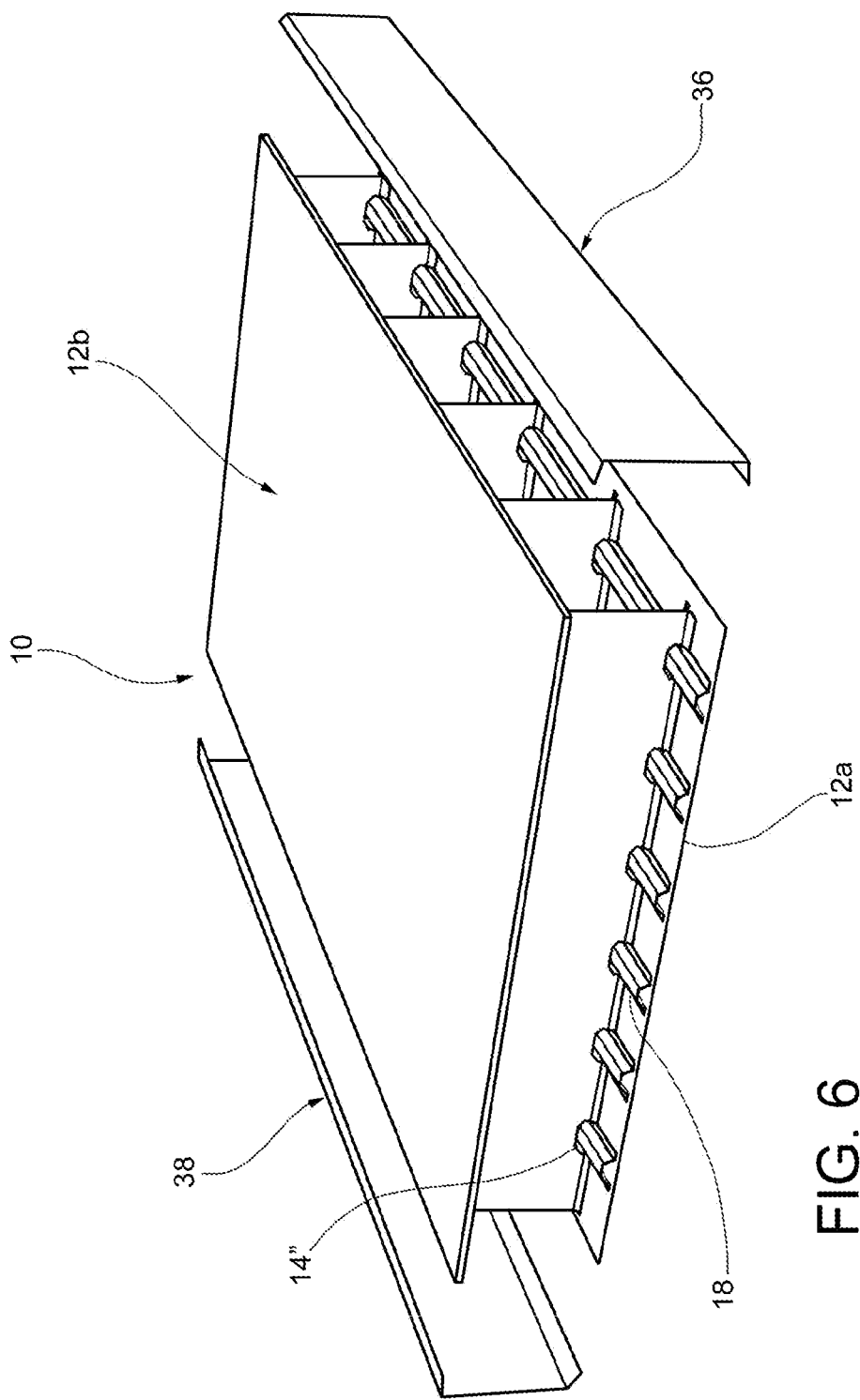
FIG. 6 is an exploded view of a wing-box completed with respective front and rear spars.

At this point, the monolithic component thus obtained may be fitted with a corresponding front spar 36 and a corresponding rear spar 38 (shown in FIG. 6, known per se), manufactured separately as loose components, by means of a traditional assembly, to complete the wing box 10.

As may be seen from the description provided above, various advantages may be obtained through a manufacturing method according to the invention.

By virtue of such a method, it is possible to reduce, compared to the so-called 'build-up' configuration, production costs, by virtue of the lower number of parts to be manufactured and managed in the production system; the number of holes and the relative fastening members to be installed, thus reducing assembly and procurement times and costs for drill bits and fastening members, which are typically very onerous; the number of inspections to be carried out during assembly for testing the fastening members and for verifying the absence of any play between the coupling parts; and the weight of the structure, due to the reduced number of fastening members required and the elimination of local thickening in the drilling areas necessary to safely withstand the design loads.

Moreover, with respect to the known techniques for manufacturing wing boxes by co-curing of composite materials, it is possible to manufacture, by virtue of the method according to the invention, a less simplified configuration that is applicable not only to horizontal stabilizers, but also to structures that require a high resistance to torsion, such as wing and tail unit boxes, while being economically competitive.

Finally, by virtue of the support inserts, that ensure stability during the curing process and avoid resin accumulation close to the openings, it is possible to manufacture the openings before the curing process by flat cutting, and then maintain the shape of these openings during the curing process.

Without altering the principle of the invention, embodiments and details of implementation may vary widely with respect to those described by way of non-limiting example, without thereby departing from the scope of the invention as described and claimed herein.

What is claimed is:

1. A method for manufacturing a wing-box for aircraft, comprising the steps of:
   a1) arranging, on a curing surface, a first panel of composite material, comprising a skin having a first side and a plurality of stringers that extend parallel to a longitudinal direction;
   a2) providing a plurality of ribs of non-polymerized composite material, each rib comprising a plate, a first pair of flanges and a second pair of flanges, each pair of flanges being arranged at opposed ends of said plate, and each rib having a plurality of through openings spaced along an edge of the plate;
   a3) providing a plurality of support inserts, each support insert comprising a bridge element, an extrados surface arranged to be put in contact with a respective opening of a rib, an intrados surface, arranged to be placed on a caul plate, and a base portion;
   b1) arranging, on each stringer, a caul plate having a cross-section that covers the respective stringer;
   b2) arranging, on said first side of the first panel, aligned along a transverse direction, pluralities of support inserts, so that the intrados surface of each support insert rests on a respective caul plate, and the base portion of each support insert rests on the skin of the first panel and/or on a respective caul plate arranged on a stringer;
   b3) arranging, on said first side of the first panel, a plurality of ribs, spaced in the longitudinal direction, wherein the respective first pair of flanges of each rib rests on said first side of the first panel, and wherein the respective plurality of openings of each rib rests on the extrados surfaces of a plurality of aligned support inserts, so that each stringer extends through a respective opening of each rib; and
   c) having the first panel and the plurality of ribs undergo a curing process in autoclave with vacuum bag, according to a specific pressure and temperature cycle, for curing non-polymerized components.

2. The method of claim 1, further comprising the step of:
   d) removing, after step c), said support inserts, in order to leave, in place of each support insert, a respective passage that puts adjacent bays of the wing-box in fluid communication with each other.

3. The method of claim 1, wherein the first panel is provided in a polymerized composite material, and wherein the method further comprises the step of:
   e) arranging, before step b3), a respective ply of high-temperature structural adhesive between each first pair of flanges of each rib and said first side of the first panel.

4. The method of claim 1, wherein the plurality of stringers of the first panel is made in a non-polymerized composite material, and wherein the method further comprises the steps of:
   f1) arranging, before step a1), solid-cross-section elongated stabilization inserts in a space defined between each stringer and the respective first panel; and
   f2) removing, after step c), said elongated stabilization inserts.

5. The method of claim 4, wherein said elongated stabilization inserts are made in a rubber of the vinyl-methyl-polysiloxane (VMQ) type belonging to group Q according to the ISO 1629 standard.

6. The method of claim 1, wherein the composite material of at least one among the first panel and the plurality of ribs comprises a matrix in a thermoset bismaleimide or resin and/or a carbon and/or glass fibre reinforcement.

7. The method of claim 1, further comprising the step of:
   g) covering the first panel and/or the plurality of ribs, before step c), with a curing bag.

8. The method of claim 1, wherein the support inserts are made in a plastic material resistant to the specific pressure and temperature cycle of the curing process of step c).

9. The method of claim 8, wherein said plastic material is thermoplastic resin.

10. The method of claim 8, wherein said plastic material is pre-cured silicon rubber.

11. The method of claim 1, wherein the cross-section in the longitudinal direction of the support inserts at the extrados surface has a thickness equivalent to the thickness of the plate of the rib.

12. The method of claim 1, wherein the plate of each rib is made by union of a pair of parallel plates placed side-by-side, both arranged to rest on the extrados surface of a respective bridge element of a support insert.

13. The method of claim 1, wherein the support inserts are free of sharp edges.

14. The method of claim 1, wherein step b2) further comprises the step of:
   b2') inserting, inside each opening of the ribs, respective support inserts, by putting the respective extrados surfaces of each support insert in contact with a respective surface of each opening.

15. The method of claim 1, wherein step b3) further comprises the step of:
   b3') placing each intrados surface of each support insert on a respective caul plate.

16. The method of claim 1, wherein each rib has a plurality of through openings spaced along two opposed edges of each plate.

17. A wing-box for aircraft obtained from the method of claim 1.

18. An aircraft comprising at least one wing-box of claim 17.

* * * * *